GEORGE H. FOX.
Improvement in Screw-Taps.
No. 114,935. Patented May 16, 1871.
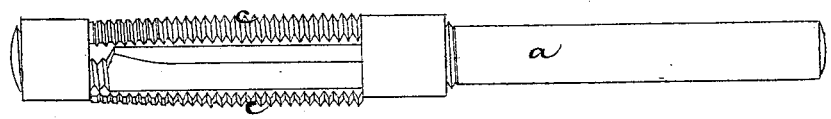
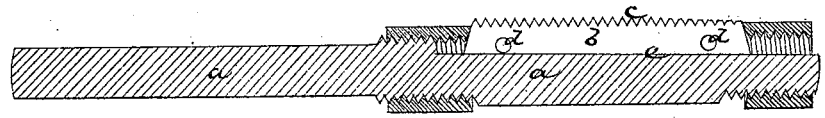
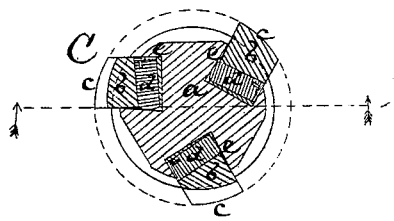
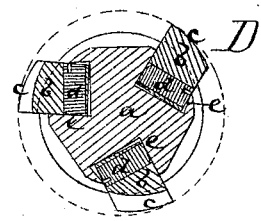

United States Patent Office.

GEORGE H. FOX, OF BOSTON, MASSACHUSETTS.

Letters Patent No. 114,935, dated May 16, 1871.

---

IMPROVEMENT IN SCREW-TAPS.

---

The Schedule referred to in these Letters Patent and making part of the same.

---

*To all whom it may concern:*

Be it known that I, GEORGE H. FOX, of Boston, in the county of Suffolk and State of Massachusetts, have invented an Improvement in Screw-Taps; and I do hereby declare that the following, taken in connection with the drawing which accompanies and forms part of this specification, is a description of my invention sufficient to enable those skilled in the art to practice it.

My invention relates to an improvement in the construction of screw-taps for forming nut-threads or internal screw-threads.

In the common screw-taps it is customary to cut the teeth down in the direction of the length of each, so that the tooth is relieved in cutting, its cutting-point being eccentric to the back of the tooth, said back sloping down slightly from a circle concentric to the said cutting-point.

This retreat, relief, or clearance, effected by turning, filing, or cutting down the teeth, though essential for a well-operating screw-tap, weakens the teeth in some way, so that the taps do not remain long in an effective condition as to cutting action, soon becoming dull or breaking.

In my invention I use for the tapping devices steel bits or bars, set in longitudinal grooves cut into the tap-spindle, each bit having the teeth cut on its outer face.

Each bit is preferably made of uniform width, and the top or mouth of the groove is of the same width as the bit; but from such mouth the groove enlarges, so that at its bottom it is of greater width than the bottom of the bit.

This being the case the bit can tip slightly, and when held against the wall of the groove opposite the cutting-point, and clamped thereto by suitable shims or other devices, the teeth are cut on the bit concentric to the center of the spindle.

After being so cut the clamping devices are withdrawn, and it will readily be seen that, if the tap be then operated, the resistance to the rotative advance of the bit will throw the bit toward the opposite wall of the groove, thus tipping it in the bit-groove so that the backs of the teeth will be thrown down or the points of the teeth up from their concentric position, thus insuring the prominence of the cutting-points and the relief of the backs of the teeth.

It is in a tap having bits with cutting-teeth thus formed that my invention consists.

The drawing represents in side and sectional elevations, and in cross-sections, a screw-tap embodying the improvement.

*a* denotes the spindle or stock.

*b*, the bits.

*c*, the bit-teeth.

The spindle is formed with a series of longitudinal grooves, *e*, cut radially into the stock, each groove containing one of the bits.

Each bit projects from its groove as seen in the drawing, and, where it enters the groove, fits into it so as to have no capability of lateral movement at the mouth of the groove; but from the mouth of the groove widens, as seen at B and C, so that the bit, being of uniform width from the cutting-teeth to the bottom, or of less width than the groove, can play or tip slightly in the groove.

In forming the teeth the bit-blank is dropped into the groove, and is set over against one wall of the groove by placing between it and the opposite wall suitable keys or chocks, or other devices, or by means of set-screws.

In practice I prefer to use screws *d*, which, being turned out as seen at C, allow the bit to be slid into the spindle or stock at the end of the groove, and, abutting at their outer ends against the adjacent wall, keep the opposite face of the bit-blank up against the opposite wall.

In this position of the parts the bit-teeth are cut, with each cutting-tooth concentric from its cutting-point throughout the length or back of the tooth with the axis of the spindle.

Having thus formed the teeth I remove the bit and take out the chocks or turn the screws back into the bit, and then replace the bit in its groove.

Now, if the tap be operated it will be evident that the pressure upon the points of the teeth will tip the bit and carry its rear face against the rear wall of the groove, and this movement will, of course, carry the teeth out of concentric position, the backs dropping toward the groove or the points being thrown outward, and thus effecting the relief of the teeth, as seen at D.

The bit may be kept in this cutting position by chocks, or by turning the screws up so as to bring their heads against the adjacent wall; but the stress upon the cutting-teeth will generally be sufficient to insure the proper position of the bit.

It will be obvious that the bit-teeth may be thus formed in one stock, and the bits inserted into bit-receiving grooves in another stock, into which the prepared bits accurately fit, in which case the enlarging groove need not be used in either stock.

The bits are shown as supported upon inclines at the bottoms of the grooves, and confined between nut-sleeves *f g* working on screw-threads *h i*, and by means of these inclines and nuts and screws the bits may be adjusted along the grooves so as to throw the bit-teeth more or less out radially, as will be readily understood.

I claim—

A screw-tap, each bit-holding groove *e* of which is wider at bottom than its bit *b*, the bit or bit-blank being confined in one position in its groove to have its teeth cut concentrically to the axis of the tap-spindle, and being forced toward or confined against the opposite wall of the groove to bring its teeth into eccentric working position.

GEO. H. FOX.

Witnesses:
FRANCIS GOULD,
C. A. TORREY.